US011299219B2

United States Patent
Raasch et al.

(10) Patent No.: US 11,299,219 B2
(45) Date of Patent: Apr. 12, 2022

(54) DISTRIBUTED VOLUMETRIC CARGO SENSOR SYSTEM

(71) Applicant: Spireon, Inc., Irvine, CA (US)

(72) Inventors: Charles F. Raasch, Foothill Ranch, CA (US); Tim Harvey, Temecula, CA (US)

(73) Assignee: Spireon, Inc., Irvine, CA (US)

( * ) Notice: Subject to any disclaimer, the term of this patent is extended or adjusted under 35 U.S.C. 154(b) by 320 days.

(21) Appl. No.: 16/541,419

(22) Filed: Aug. 15, 2019

(65) Prior Publication Data

US 2020/0055553 A1 Feb. 20, 2020

Related U.S. Application Data

(60) Provisional application No. 62/765,256, filed on Aug. 20, 2018.

(51) Int. Cl.

| | |
|---|---|
| *B62D 53/06* | (2006.01) |
| *G01S 17/08* | (2006.01) |
| *G01S 15/08* | (2006.01) |
| *G06Q 10/08* | (2012.01) |
| *G01S 17/04* | (2020.01) |
| *G01S 17/88* | (2006.01) |

(52) U.S. Cl.
CPC .............. *B62D 53/06* (2013.01); *G01S 15/08* (2013.01); *G01S 17/04* (2020.01); *G01S 17/08* (2013.01); *G06Q 10/087* (2013.01); *G01S 17/88* (2013.01)

(58) Field of Classification Search
CPC ......... B62D 53/06; G01S 15/08; G01S 15/87; G01S 15/88; G01S 17/04; G01S 17/08; G01S 17/87; G01S 17/88; G06Q 10/083; G06Q 10/087; G06Q 50/28; G06Q 50/30
See application file for complete search history.

(56) References Cited

U.S. PATENT DOCUMENTS

| | | |
|---|---|---|
| 906,021 A | 12/1908 | Herrick |
| 4,633,407 A | 12/1986 | Freienstein et al. |
| 4,837,700 A | 6/1989 | Ando et al. |

(Continued)

FOREIGN PATENT DOCUMENTS

| | | |
|---|---|---|
| CA | 2609106 A1 | 10/2008 |
| CA | 2683208 A1 | 11/2008 |

(Continued)

*Primary Examiner* — Quan Zhen Wang
*Assistant Examiner* — Rajsheed O Black-Childress
(74) *Attorney, Agent, or Firm* — Luedeka Neely Group, P.C.

(57) ABSTRACT

A cargo detection apparatus installed within a cargo container includes multiple distance sensors and one or more processors in communication with the distance sensors. The distance sensors, which are configured for mounting on or adjacent to a ceiling of the cargo container, generate distance signals. Each distance signal indicates a distance between a corresponding one of the distance sensors and a surface within the interior space of the cargo container. The one or more processors are operable to execute instructions to compare the distance indicated by each of the distance signals to a distance threshold, and generate a cargo-present indication if the distance is less than the distance threshold. The distance sensors may be laser-ranging time-of-flight sensors or ultrasonic sensors.

21 Claims, 6 Drawing Sheets

(56) References Cited

U.S. PATENT DOCUMENTS

| | | |
|---|---|---|
| 5,119,301 A | 6/1992 | Shimizu et al. |
| 5,289,369 A | 2/1994 | Hirshberg |
| 5,299,132 A | 3/1994 | Wortham |
| 5,307,277 A | 4/1994 | Hirano |
| 5,870,029 A | 2/1999 | Otto et al. |
| 5,877,956 A | 3/1999 | Frank et al. |
| 6,025,774 A | 2/2000 | Forbes |
| 6,240,365 B1 | 5/2001 | Bunn |
| 6,249,217 B1 | 6/2001 | Forbes |
| 6,510,381 B2 | 1/2003 | Grounds et al. |
| 6,512,465 B2 | 1/2003 | Flick |
| 6,701,234 B1 | 3/2004 | Vogelsang |
| 6,771,970 B1 | 8/2004 | Dan |
| 6,816,090 B2 | 11/2004 | Teckchandani et al. |
| 6,930,638 B2 | 8/2005 | Lloyd et al. |
| 6,931,309 B2 | 8/2005 | Phelan et al. |
| 6,985,087 B2 | 1/2006 | Soliman |
| 7,034,683 B2 | 4/2006 | Ghazarian |
| 7,091,835 B2 | 8/2006 | Boulay et al. |
| 7,102,510 B2 | 9/2006 | Boling et al. |
| 7,170,390 B2 | 1/2007 | Quiñones et al. |
| 7,174,243 B1 | 2/2007 | Lightner et al. |
| 7,177,738 B2 | 2/2007 | Diaz |
| 7,215,282 B2 | 5/2007 | Boling et al. |
| 7,266,378 B2 | 9/2007 | Norta et al. |
| 7,346,439 B2 | 3/2008 | Bodin |
| 7,366,551 B1 | 4/2008 | Hartley |
| 7,405,658 B2 | 7/2008 | Richards |
| 7,546,151 B2 | 6/2009 | Hartley |
| 7,574,195 B2 | 8/2009 | Krasner et al. |
| 7,593,999 B2 | 9/2009 | Nathanson |
| 7,675,423 B2 | 3/2010 | Boling et al. |
| 7,701,363 B1 | 4/2010 | Zlojutro |
| 7,725,216 B2 | 5/2010 | Kim |
| 7,817,033 B2 | 10/2010 | Motoyama |
| 7,818,098 B2 | 10/2010 | Koepf et al. |
| 7,830,305 B2 | 11/2010 | Boling et al. |
| 7,893,818 B2 | 2/2011 | Smoyer et al. |
| 7,970,496 B2 | 6/2011 | Koepf et al. |
| 8,018,332 B2 | 9/2011 | Boling et al. |
| 8,126,601 B2 | 2/2012 | Kapp et al. |
| 8,237,591 B2 | 8/2012 | Holcomb et al. |
| 8,330,626 B1 | 12/2012 | Adelson |
| 8,330,817 B1 | 12/2012 | Foster |
| 8,368,561 B2 | 2/2013 | Welch et al. |
| 8,452,673 B2 | 5/2013 | Boling et al. |
| 8,462,021 B2 | 6/2013 | Welch et al. |
| 8,510,200 B2 | 8/2013 | Pearlman et al. |
| 8,527,135 B2 | 9/2013 | Lowrey et al. |
| 8,565,963 B2 | 10/2013 | Burke |
| 8,612,137 B2 | 12/2013 | Harris et al. |
| 8,626,152 B2 | 1/2014 | Farrell et al. |
| 8,655,544 B2 | 2/2014 | Fletcher et al. |
| 8,671,063 B2 | 3/2014 | Ehrman et al. |
| 8,725,326 B2 | 5/2014 | Kapp et al. |
| 8,760,274 B2 | 6/2014 | Boling et al. |
| 8,799,461 B2 | 8/2014 | Herz et al. |
| 8,933,802 B2 | 1/2015 | Baade |
| 8,970,701 B2 | 3/2015 | Lao |
| 9,008,894 B2 | 4/2015 | Bishop et al. |
| 9,049,564 B2 | 6/2015 | Muetzel et al. |
| 9,060,213 B2 | 6/2015 | Jones |
| 9,070,271 B2 | 6/2015 | Baade et al. |
| 9,316,737 B2 | 4/2016 | Baade |
| 9,332,404 B2 | 5/2016 | Boling et al. |
| 9,516,394 B2 | 12/2016 | Carlo et al. |
| 9,551,788 B2 | 1/2017 | Epler |
| 9,779,379 B2 | 10/2017 | Hall et al. |
| 9,779,449 B2 | 10/2017 | Meyer et al. |
| 10,089,598 B2 | 10/2018 | Reeder et al. |
| 10,169,822 B2 | 1/2019 | Jarvis et al. |
| 10,223,744 B2 | 3/2019 | Brady et al. |
| 10,232,823 B1 | 3/2019 | Bobay et al. |
| 10,255,824 B2 | 4/2019 | Pearlman et al. |
| 10,311,315 B2 | 6/2019 | Drazan et al. |
| 2001/0018639 A1 | 8/2001 | Bunn |
| 2001/0034577 A1 | 10/2001 | Grounds et al. |
| 2002/0000916 A1 | 1/2002 | Richards |
| 2002/0014978 A1 | 2/2002 | Flick |
| 2002/0059126 A1 | 5/2002 | Ricciardi |
| 2002/0082025 A1 | 6/2002 | Baese et al. |
| 2002/0184062 A1 | 12/2002 | Diaz |
| 2002/0186144 A1 | 12/2002 | Meunier |
| 2003/0083060 A1 | 5/2003 | Menendez |
| 2003/0151501 A1 | 8/2003 | Teckchandani et al. |
| 2003/0151507 A1 | 8/2003 | Andre et al. |
| 2003/0174067 A1 | 9/2003 | Soliman |
| 2004/0093291 A1 | 5/2004 | Bodin |
| 2004/0130440 A1 | 7/2004 | Boulay et al. |
| 2004/0143378 A1 | 7/2004 | Vogelsang |
| 2004/0162063 A1 | 8/2004 | Quinones et al. |
| 2004/0225557 A1 | 11/2004 | Phelan et al. |
| 2004/0246177 A1 | 12/2004 | Lloyd et al. |
| 2005/0021199 A1 | 1/2005 | Zimmerman et al. |
| 2005/0026627 A1 | 2/2005 | Boling et al. |
| 2005/0134504 A1 | 6/2005 | Harwood et al. |
| 2005/0215194 A1 | 9/2005 | Boling et al. |
| 2005/0237166 A1 | 10/2005 | Chen |
| 2006/0007038 A1 | 1/2006 | Boling et al. |
| 2006/0055561 A1 | 3/2006 | Kamali et al. |
| 2006/0087411 A1 | 4/2006 | Chang |
| 2006/0129290 A1 | 6/2006 | Zimmerman et al. |
| 2007/0013779 A1 | 1/2007 | Gin et al. |
| 2007/0152844 A1 | 7/2007 | Hartley et al. |
| 2007/0167147 A1 | 7/2007 | Krasner et al. |
| 2007/0290923 A1 | 12/2007 | Norta et al. |
| 2008/0015748 A1 | 1/2008 | Nagy |
| 2008/0147245 A1 | 6/2008 | Koepf et al. |
| 2008/0162045 A1 | 7/2008 | Lee |
| 2008/0176537 A1 | 7/2008 | Smoyer et al. |
| 2008/0186135 A1 | 8/2008 | Boling et al. |
| 2008/0198018 A1 | 8/2008 | Hartley |
| 2008/0278314 A1 | 11/2008 | Miller et al. |
| 2008/0287151 A1 | 11/2008 | Fjelstad et al. |
| 2008/0294302 A1 | 11/2008 | Basir |
| 2009/0043445 A1 | 2/2009 | Bishop et al. |
| 2009/0079591 A1 | 3/2009 | Motoyama |
| 2009/0112394 A1 | 4/2009 | Lepejian et al. |
| 2009/0140887 A1 | 6/2009 | Breed et al. |
| 2009/0224966 A1 | 9/2009 | Boling et al. |
| 2010/0094482 A1 | 4/2010 | Schofield et al. |
| 2010/0103042 A1 | 4/2010 | Bishop et al. |
| 2010/0117868 A1 | 5/2010 | Wiemeersch et al. |
| 2010/0191412 A1 | 7/2010 | Kim |
| 2010/0265104 A1 | 10/2010 | Zlojutro |
| 2010/0299020 A1 | 11/2010 | Koepf et al. |
| 2011/0016514 A1 | 1/2011 | Carlo et al. |
| 2011/0090075 A1 | 4/2011 | Armitage et al. |
| 2011/0093159 A1 | 4/2011 | Boling et al. |
| 2011/0143669 A1 | 6/2011 | Farrell et al. |
| 2011/0241903 A1 | 10/2011 | Welch et al. |
| 2012/0041618 A1 | 2/2012 | Sun et al. |
| 2012/0077475 A1 | 3/2012 | Holcomb et al. |
| 2012/0078497 A1 | 3/2012 | Burke |
| 2012/0197484 A1 | 8/2012 | Nath et al. |
| 2012/0299721 A1 | 11/2012 | Jones |
| 2012/0299755 A1 | 11/2012 | Jones |
| 2013/0059607 A1 | 3/2013 | Herz et al. |
| 2013/0066757 A1 | 3/2013 | Lovelace et al. |
| 2013/0088371 A1 | 4/2013 | Welch et al. |
| 2013/0100286 A1 | 4/2013 | Lao |
| 2013/0113637 A1 | 5/2013 | Sin et al. |
| 2013/0127617 A1 | 5/2013 | Baade et al. |
| 2013/0141249 A1 | 6/2013 | Peariman et al. |
| 2013/0144667 A1 | 6/2013 | Ehrman et al. |
| 2013/0144770 A1 | 6/2013 | Boling et al. |
| 2013/0144771 A1 | 6/2013 | Boling et al. |
| 2013/0144805 A1 | 6/2013 | Boling et al. |
| 2013/0147617 A1 | 6/2013 | Boling et al. |
| 2013/0159214 A1 | 6/2013 | Boling et al. |
| 2013/0185193 A1 | 7/2013 | Boling et al. |
| 2013/0249713 A1 | 9/2013 | Adelson |
| 2013/0297199 A1 | 11/2013 | Kapp et al. |
| 2013/0302757 A1 | 11/2013 | Pearlman et al. |

(56) References Cited

U.S. PATENT DOCUMENTS

| | | |
|---|---|---|
| 2014/0012634 A1 | 1/2014 | Pearlman et al. |
| 2014/0036072 A1 | 2/2014 | Lyall et al. |
| 2014/0052605 A1 | 2/2014 | Beerle et al. |
| 2014/0074692 A1 | 3/2014 | Beede et al. |
| 2014/0095061 A1 | 4/2014 | Hyde |
| 2014/0125500 A1 | 5/2014 | Baade |
| 2014/0125501 A1 | 5/2014 | Baade |
| 2014/0220966 A1 | 8/2014 | Muetzel et al. |
| 2014/0267688 A1 | 9/2014 | Aich et al. |
| 2014/0280658 A1 | 9/2014 | Boling et al. |
| 2015/0006207 A1 | 1/2015 | Jarvis et al. |
| 2015/0019270 A1 | 1/2015 | Jarvis et al. |
| 2015/0024727 A1 | 1/2015 | Hale-Pletka et al. |
| 2015/0032291 A1 | 1/2015 | Lowrey et al. |
| 2015/0066362 A1 | 3/2015 | Meyer et al. |
| 2015/0067312 A1 | 3/2015 | Lewandowski et al. |
| 2015/0095255 A1 | 4/2015 | Hall et al. |
| 2015/0168173 A1 | 6/2015 | Lewis-Evans et al. |
| 2015/0172518 A1 | 6/2015 | Lucas et al. |
| 2015/0186991 A1 | 7/2015 | Meyer et al. |
| 2015/0260529 A1 | 9/2015 | Petersen |
| 2015/0332525 A1 | 11/2015 | Harris et al. |
| 2015/0356497 A1 | 12/2015 | Reeder et al. |
| 2015/0373487 A1 | 12/2015 | Miller et al. |
| 2016/0225072 A1 | 8/2016 | Brady et al. |
| 2016/0282466 A1 | 9/2016 | Epler |
| 2017/0262717 A1 | 9/2017 | Drazan et al. |
| 2018/0222504 A1* | 8/2018 | Birch .................. B61L 23/048 |
| 2018/0300967 A1 | 10/2018 | Winograd |
| 2018/0352198 A1 | 12/2018 | Raasch et al. |
| 2019/0005442 A1 | 1/2019 | Reeder et al. |
| 2019/0061692 A1 | 2/2019 | Bobay et al. |
| 2019/0114577 A1* | 4/2019 | Kilburn .................. G06F 9/542 |
| 2019/0279494 A1 | 9/2019 | Raasch et al. |

FOREIGN PATENT DOCUMENTS

| | | |
|---|---|---|
| CA | 2837320 A1 | 11/2012 |
| CA | 2856796 A1 | 5/2013 |
| CA | 2867447 A1 | 9/2013 |
| CA | 2826902 A1 | 3/2014 |
| CA | 2828835 A1 | 4/2014 |
| CA | 2832185 A1 | 5/2014 |
| CA | 2846134 A1 | 9/2014 |
| CN | 2921908 | 7/2007 |
| CN | 101240734 A | 8/2008 |
| CN | 101734228 A | 6/2010 |
| CN | 101192322 B | 7/2012 |
| CN | 102779407 A | 11/2012 |
| CN | 103813477 A | 5/2014 |
| CN | 104931066 A | 9/2015 |
| DE | 4423328 A1 | 1/1996 |
| EP | 0096252 A3 | 5/1987 |
| EP | 0451482 A1 | 10/1991 |
| EP | 0519630 A2 | 12/1992 |
| EP | 0393935 B1 | 3/1995 |
| EP | 0744727 A3 | 2/1997 |
| EP | 1191500 A1 | 3/2002 |
| EP | 1384635 A1 | 1/2004 |
| EP | 2418461 A1 | 2/2012 |
| JP | 2006123891 A | 5/2006 |
| JP | 2014170000 A | 9/2014 |
| MX | 2009011420 A | 3/2010 |
| MX | 2010001545 A | 8/2010 |
| WO | 1984001823 A1 | 5/1984 |
| WO | 1999063357 A1 | 12/1999 |
| WO | 2000070530 A1 | 11/2000 |
| WO | 2001024393 A1 | 4/2001 |
| WO | 2001059601 A1 | 8/2001 |
| WO | 2002089077 A1 | 11/2002 |
| WO | 2003034089 A2 | 4/2003 |
| WO | 2003036462 A1 | 5/2003 |
| WO | 2003079717 A2 | 9/2003 |
| WO | 2003012473 | 3/2004 |
| WO | 2004075090 A1 | 9/2004 |
| WO | 2004102536 A3 | 6/2005 |
| WO | 2005086933 A2 | 9/2005 |
| WO | 2006028995 A2 | 3/2006 |
| WO | 2006028995 A3 | 2/2007 |
| WO | 2007146449 A2 | 12/2007 |
| WO | 2008034097 A2 | 3/2008 |
| WO | 2007146449 A3 | 10/2008 |
| WO | 2008121612 A1 | 10/2008 |
| WO | 2008141456 A1 | 11/2008 |
| WO | 2008144411 A1 | 11/2008 |
| WO | 2005086933 A3 | 12/2008 |
| WO | 2009021117 A1 | 2/2009 |
| WO | 2009058972 A3 | 7/2009 |
| WO | 2009097595 A1 | 8/2009 |
| WO | 2010047887 A2 | 4/2010 |
| WO | 2012162358 A1 | 11/2012 |
| WO | 2012162450 A1 | 11/2012 |
| WO | 2013078291 A1 | 5/2013 |
| WO | 2013138798 A1 | 9/2013 |
| WO | 2014008752 A1 | 1/2014 |
| WO | 2016061355 A1 | 4/2016 |

* cited by examiner

FIG. 4A
(view A-A)

DISTRIBUTED VOLUMETRIC CARGO SENSOR SYSTEM

RELATED APPLICATIONS

This nonprovisional application claims priority to provisional patent application Ser. No. 62/765,256 filed Aug. 20, 2018, titled Distributed Volumetric Cargo Sensor, the entire contents of which are incorporated herein by reference.

FIELD

This invention relates to the field of cargo transportation. More particularly, this invention relates to a system for providing a volumetric occupancy reading to indicate the load status of a cargo container, such as a cargo trailer.

BACKGROUND

Knowledge of the volumetric occupancy of cargo containers, such as cargo trailers, is important to cargo carriers. If a dispatcher knows that there is room to accept more cargo in a particular trailer that is en route to a destination, the dispatcher can divert the trailer to pick up a load at a nearby customer's facility. In this way, owners of trailers can make more efficient use of their assets, increasing profitability and reducing waste.

Previous solutions were capable only of determining if cargo was present or absent in a container. Although optical imaging techniques have been used to determine the load state of cargo containers, such techniques have been unreliable and difficult to implement. Optical imaging techniques are prone to inaccuracy due to potentially large distances separating the imaging device from a distant portion of the trailer. These techniques require significant computing resources to provide an accurate cargo occupancy indication.

What is needed, therefore, is a cargo sensor system that can be used on a loaded trailer or other cargo container to determine the amount of loaded cargo without reliance on optical imaging techniques.

SUMMARY

The above and other needs are met by a cargo sensor system that uses distance sensors distributed throughout a cargo trailer or other type of cargo container. In a preferred embodiment, each distance sensor is a laser time-of-flight (ToF) sensor. However, the distance sensor may be any sensor that can determine the distance between the sensor and an impeding object, such as an ultrasonic sensor.

Embodiments described herein also provide a method for detecting cargo within a cargo container that has a ceiling, a floor, and an interior space disposed between the ceiling and the floor. In a preferred embodiment, the method includes:
  (a) mounting multiple distance sensors on or adjacent to the ceiling of the cargo container;
  (b) the distance sensors generating distance signals that each indicate a distance between a corresponding one of the distance sensors and a surface within the interior space of the cargo container;
  (c) for each of the distance signals, comparing the distance to a distance threshold; and
  (d) generating a cargo-present indication if the distance is less than the distance threshold.

In some embodiments, each of the distance sensors has a field of view, and
  step (a) includes distributing the distance sensors across the ceiling of the cargo container such that their fields of view define multiple cargo detection areas distributed across the floor of the cargo container, wherein each cargo detection area corresponds to a portion of a total area of the floor of the cargo container, and
  step (b) includes generating the distance signals such that each indicate a distance between a corresponding one of the distance sensors and a surface located within a corresponding one of the cargo detection areas.

In some embodiments, the method includes:
  (e) determining how many cargo-present indications are generated in step (d); and
  (f) calculating how much of the total area of the floor of the cargo container is occupied by cargo based on how many cargo-present indications are determined in step (e).

In some embodiments, the method includes:
  (e) for each of the cargo-present indications generated in step (d), determining a cargo height value based on the distance between the corresponding distance sensor and the surface located within the corresponding cargo detection area; and
  (f) calculating a total volume of the interior space of the cargo container occupied by cargo based on the cargo height values and area values for the portions of the total area of the floor of the cargo container in which cargo is present.

In some embodiments, step (a) includes mounting one or more sensor modules on or adjacent to the ceiling of the cargo container, wherein each of the one or more sensor modules contain one or more of the distance sensors.

In some embodiments, step (a) includes distributing the sensor modules across the length of a central portion of the ceiling of the cargo container.

In some embodiments, step (a) includes distributing the sensor modules across the length of the cargo container adjacent to locations at which the ceiling of the cargo container meets a wall of the cargo container.

In some embodiments, step (a) includes mounting one or more sensor modules on a door of the cargo container, so that the distance sensors contained in the sensor modules mounted on the door each have a field of view directed toward a back wall of the cargo container when the door is in a closed position and directed toward the floor of the cargo container when the door is in an open position.

In some embodiments, each of the distance signals generated in step (b) indicate a distance between a corresponding one of the distance sensors and either a surface of a piece of cargo or the floor of the cargo container.

In some embodiments, the ceiling of the cargo container is disposed at a height above the floor of the cargo container, and step (c) includes comparing the distance to a distance threshold that is less than the height.

In some embodiments, the method includes providing the cargo-present indications generated in step (d) to a tracker unit mounted on the cargo container, and based on the cargo-present indications, transmitting cargo loading information from the tracker unit to a backend server via a data communication network.

In another aspect, embodiments described herein provide an apparatus for detecting cargo within a cargo container that has a ceiling, a floor, and an interior space disposed between the ceiling and the floor. A preferred embodiment of the apparatus includes multiple distance sensors and one or more processors in communication with the distance sensors. The distance sensors, which are configured for mounting on or adjacent to the ceiling of the cargo container, generate distance signals. Each distance signal indicates a distance between a corresponding one of the distance sensors and a surface within the interior space of the cargo container. The one or more processors are operable to execute instructions to compare the distance indicated by each of the distance signals to a distance threshold, and generate a cargo-present indication if the distance is less than the distance threshold.

In some embodiments, each of the distance sensors has a field of view, and they are mounted to the ceiling of the cargo container such that their fields of view define multiple cargo detection areas distributed across the floor of the cargo container. Each cargo detection area corresponds to a portion of the total area of the floor of the cargo container. Each of the distance signals indicate a distance between a corresponding one of the distance sensors and a surface located within a corresponding one of the cargo detection areas.

In some embodiments, the one or more processors are operable to execute instructions to calculate how much of the total area of the floor of the cargo container is occupied by cargo based how many cargo-present indications have been generated.

In some embodiments, the one or more processors are operable to execute instructions to:
- for each cargo-present indication, determine a cargo height value based on the distance between the corresponding distance sensor and the surface located within the corresponding cargo detection area; and
- calculate the total volume of the interior space of the cargo container occupied by cargo based on cargo height values and area values for the portions of the total area of the floor of the cargo container in which cargo is present.

In some embodiments, the sensor modules are configured for mounting on or adjacent to the ceiling of the cargo container, and they each contain one or more distance sensors.

In some embodiments, the one or more processors are components of the one or more sensor modules.

In some embodiments, each distance sensor has a field of view that is aligned in a different direction from fields of view of other distance sensors contained in one and the same sensor module.

In some embodiments, the sensor modules are distributed across the length of the central portion of the ceiling of the cargo container.

In some embodiments, the sensor modules are distributed across the length of the cargo container adjacent to locations at which the ceiling of the cargo container meets a wall of the cargo container.

In some embodiments, one or more of the sensor modules are mounted on a door of the cargo container. The distance sensors contained in the sensor modules mounted on the door each have a field of view directed toward a back wall of the cargo container when the door is in a closed position, and directed toward the floor of the cargo container when the door is in an open position.

In some embodiments, each of the distance signals indicate a distance between a corresponding one of the distance sensors and either a surface of a piece of cargo or the floor of the cargo container.

In some embodiments, the ceiling of the cargo container is disposed at a height above the floor of the cargo container, and the one or more processors are operable to execute instructions to compare the distance to a distance threshold that is less than the height.

Some embodiments include a tracker unit configured for mounting on the cargo container. The tracker unit is operable to generate cargo loading information based on the cargo-present indication, and to transmit the cargo loading information from the tracker unit to a backend server via a data communication network.

In some embodiments, the one or more processors are components of the tracker unit.

In some embodiments, the one or more processors are components of the backend server.

In some embodiments, the distance sensors comprise laser-ranging time-of-flight sensors or ultrasonic sensors.

BRIEF DESCRIPTION OF THE DRAWINGS

Other embodiments of the invention will become apparent by reference to the detailed description in conjunction with the figures, wherein elements are not to scale, so as to more clearly show the details, wherein like reference numbers indicate like elements throughout the several views, and wherein.

DETAILED DESCRIPTION

Figure 1:
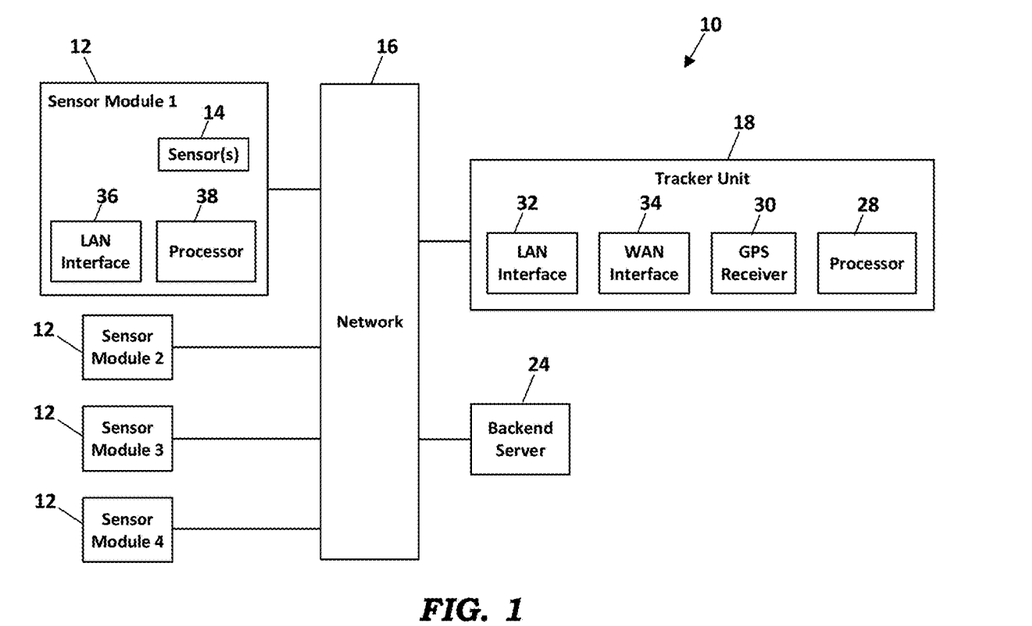
FIG. 1 depicts a cargo sensing system according to an embodiment of the invention.
Figure 2:
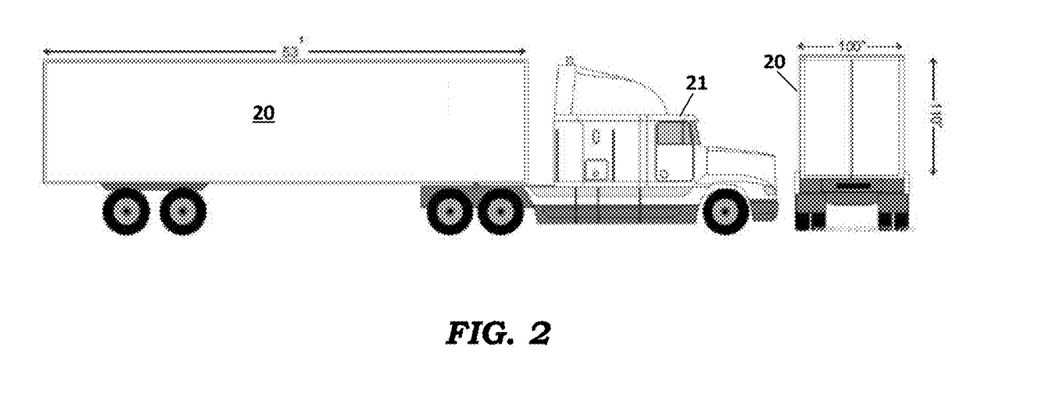
FIG. 2 depicts a typical cargo trailer attached to a tractor.

FIG. 1 depicts an embodiment of a cargo sensing system 10. Generally, the system 10 includes one or more sensor modules 12 distributed throughout a cargo container, such as the trailer 20 depicted in FIG. 2. Each sensor module 12 includes one or more distance sensors 14, which in a preferred embodiment are laser-ranging time-of-flight (ToF) sensors, such as the ST Micro VL53L1X manufactured by ST Microelectronics. In other embodiments, the distance sensor may implement other technology to determine the distance between the sensor and an impeding object. In some embodiments, the sensors 14 are ultrasonic sensors. In a preferred embodiment, each sensor module 12 includes a processor 38 for processing information from the distance sensor(s) 14, and local area network communication electronics 36 for communicating with other system components as described hereinafter. The local network communications electronics 36 may comprise one or more interfaces to implement wired communications protocols, such as Inter-integrated Circuit (I2C), Serial Peripheral Interface (SPI), Universal Asynchronous Receiver/Transmitter (UART), or Ethernet, or to implement wireless communications protocols, such as Wi-Fi, Bluetooth, or Bluetooth Low Energy.

Data generated by the sensor modules 12 are provided to a trailer tracker unit 18 and/or a backend server 24 for processing as described hereinafter. The tracker unit 18 monitors the location and health of the trailer 20, and sends the current cargo loading state of the trailer to the backend server 24 based on cargo detected using the sensor modules 12. The tracker unit 18, which is typically located in or on the trailer 20, preferably includes a processor 28, GPS receiver electronics 30 for determining location coordinates of the trailer 20, local area network communication electronics 32 for communicating with the sensor modules 12, and wide area network communication electronics 34 (such as a wireless cellular data modem) for communicating with the backend server 24. The local network communications electronics 30 may comprise one or more interfaces to implement wired communications protocols, such as I2C, SPI, UART, or Ethernet, or to implement wireless communications protocols, such as Wi-Fi, Bluetooth, or Bluetooth Low Energy. The tracker unit 18 may also interface with multiple external sensors, such as door sensors and temperature sensors.

The sensor modules 12 preferably communicate with the tracker unit 18 and/or the backend server 24 through a network 16, which may comprise a local area network in the trailer 20, a wireless data communication network, the Internet, or a combination of such networks. The sensor modules 12 may also communicate with the tracker unit 18 directly through serial or parallel interfaces. Each sensor module 12 preferably includes a local processor that communicates with processors of other sensor modules 12 through the network 16 or through a series of serial ports.

Figure 4A:
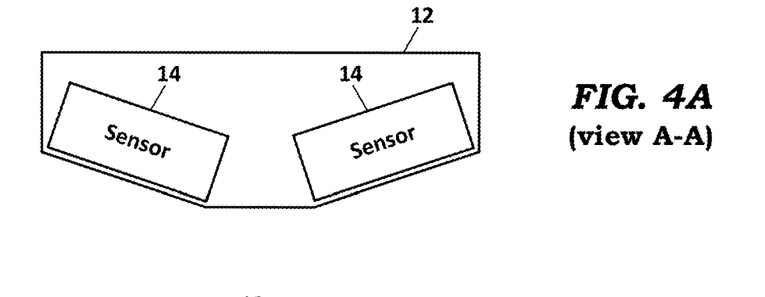
FIGS. 4A and 4B depict a sensor module according to a preferred embodiment.
Figure 4B:
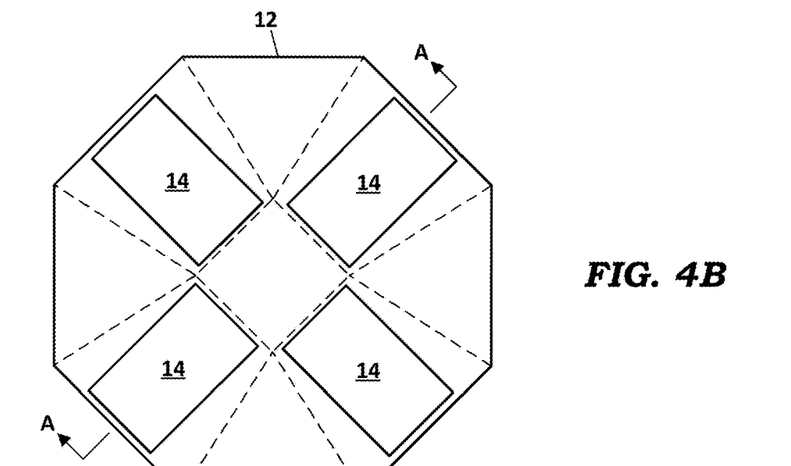
Figure 5A:
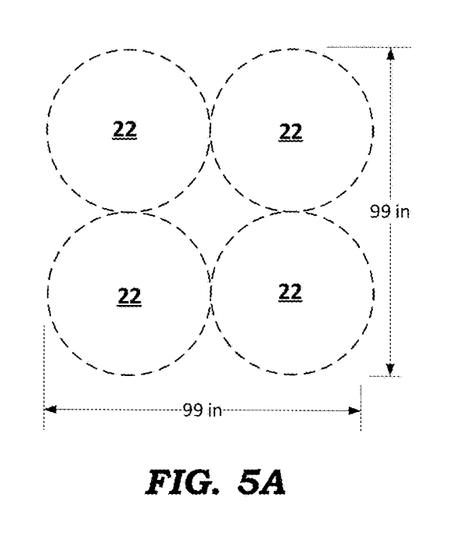
FIGS. 5A and 5B depict cargo detection areas according to a preferred embodiment.
Figure 5B:
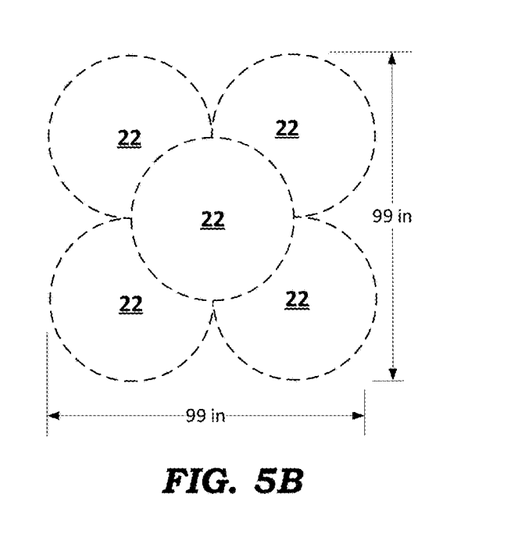
Figure 6:
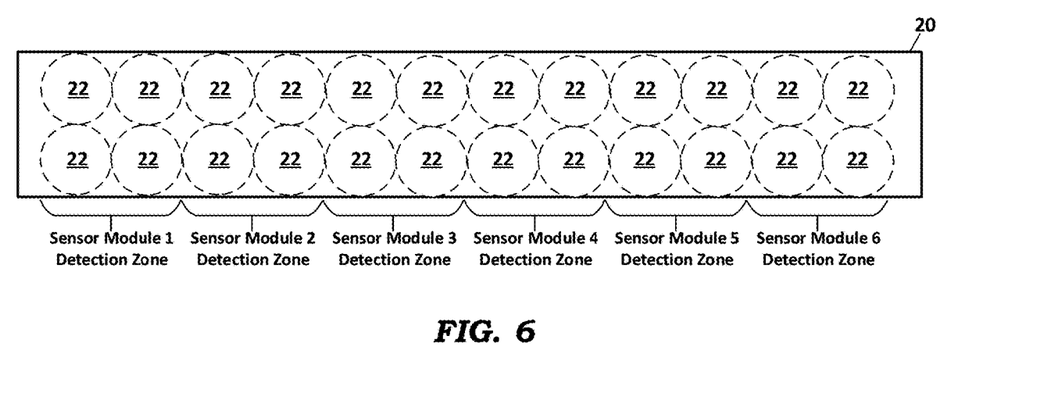
FIG. 6 depicts a top plan view of a cargo trailer with cargo detection areas according to a preferred embodiment.

The preferred ToF sensor 14 has an angular field of view of about 25 degrees. A single one of these sensors mounted on the ceiling of the trailer 20 and pointing directly downward has a field of view that covers about half of the width of the floor area of the trailer. In a preferred embodiment depicted in FIGS. 4A and 4B, each sensor module 12 incorporates a faceted structure having four or more sensors 14 with their lines-of-sight angularly offset from each other by about 12 degrees in four or more different directions. As depicted in FIG. 5A, this multi-sensor module 12 provides a sensor pattern comprising four or more detection areas 22 that cover the trailer floor from wall-to-wall. This pattern allows each sensor module 12 to provide an accurate reading of the cumulative height of cargo containers in the module's detection areas. A fifth sensor 14 may be added pointing directly down to cover the open spot in the middle (see FIG. 5B). In one embodiment, a sensor module positioned closest to the trailer rear door may have an additional sensor pointing toward the door, thereby allowing that particular module to detect whether the door is open or closed, either by sensing ambient light, sensing the distance to the door, or a combination of both.

In an embodiment depicted in FIGS. 3A-3C, 4A, 4B, and 6, six sensor modules 12 are distributed along the length of the ceiling of the trailer 20, each including four sensors 14, thereby covering substantially the entire floor of the trailer 20 with twenty-four sensors. In some embodiments that do not require this level of accuracy, the floor of the trailer may be more sparsely sampled and still provide acceptable results.

Figure 9:
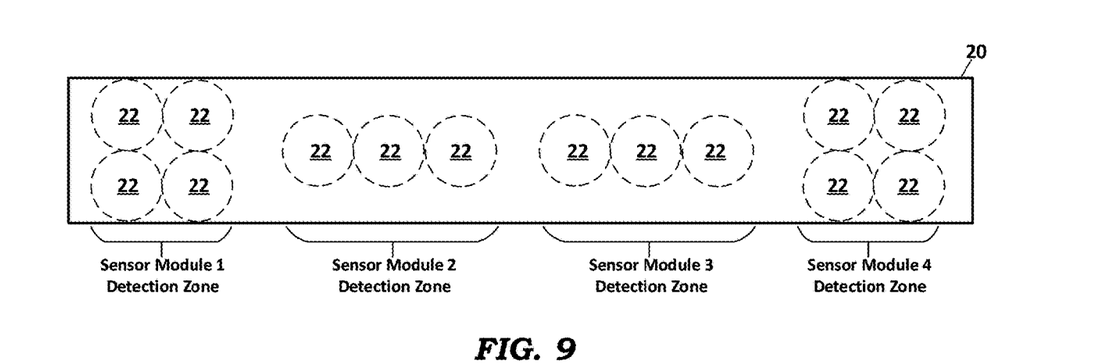
FIG. 9 depicts a top plan view of a cargo trailer with cargo detection areas according to an alternative embodiment.

Although a preferred embodiment disperses sensors evenly across the length of the trailer 20, other embodiments include more sensors in areas of the trailer 20 that are more likely to contain cargo (such as in the front and the back) and fewer sensors in the broad middle area of the trailer 20. For example, as depicted in FIG. 9, one embodiment includes sensor modules near the front and rear sections of the trailer that provide four detection areas, and sensor modules in the center that provide three detection areas.

Figure 7A:
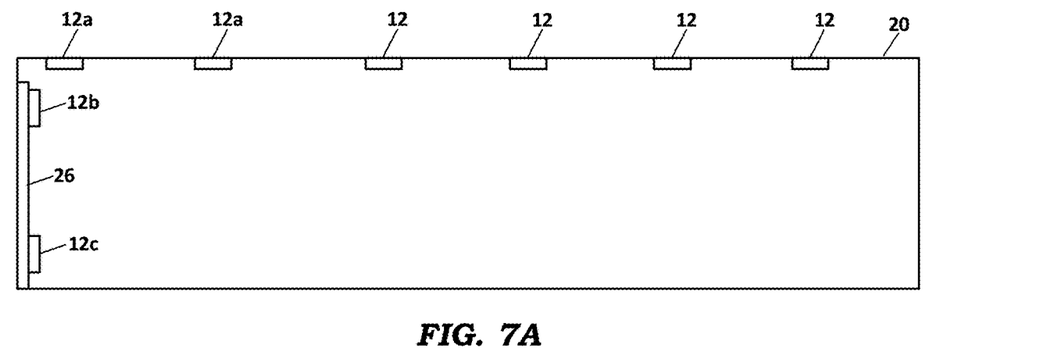
FIG. 7A depicts a side elevation view of a cargo trailer with the trailer door closed and with cargo sensing modules installed therein according to a preferred embodiment.
Figure 7B:
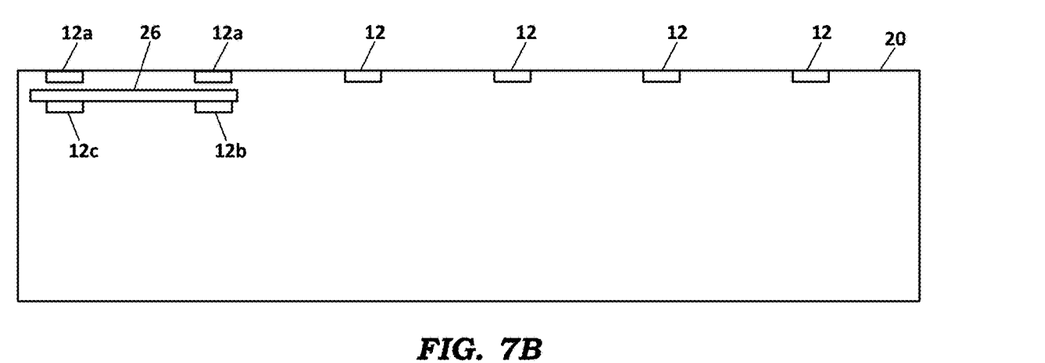
FIG. 7B depicts a side elevation view of a cargo trailer with the trailer door open and with cargo sensing modules installed therein according to a preferred embodiment.

In many trailers, the rear door is a roll-up door. In such a situation, the raised door may block one or more sensor modules mounted on the ceiling nearest the rear end of the trailer, such as the sensor modules 12a as shown in FIGS. 7A and 7B. In an embodiment designed to address this situation, a sensor module 12c may be mounted near the bottom of the door 26 and a sensor module 12b may be mounted near the top of the door 26. The sensor module 12c preferably includes a sensor that points down toward the floor when the door is closed. This sensor module 12c may be used to determine whether the door is closed or open, and to determine how far the door is open based on the distance from the sensor module 12c to the floor. When the door 26 is in a fully open position (FIG. 7B), the sensor modules 12b and 12c mounted near the top and bottom of the door face vertically down toward the floor. In this door-open position, the sensor modules 12b and 12c may be used for cargo detection, just as the sensor modules 12a that are blocked by the open door 26 were used.

In some embodiments, each sensor module 12 includes one or more accelerometers that can be used to determine the orientation of the sensors 14—whether they are facing horizontally or vertically—by sensing the direction of the acceleration of gravity relative to the position of the sensor module 12. Using this orientation information, the trailer tracker unit 18 or back-end server system 24 can determine how to treat the information provided by each sensor module 12.

Figure 8:
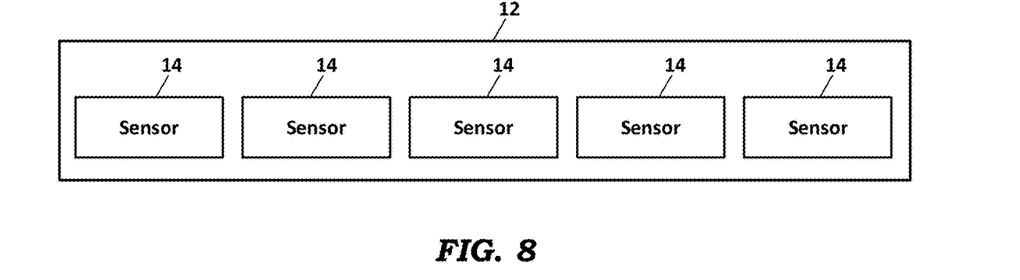
FIG. 8 depicts a sensor module according to an alternative embodiment.

In an embodiment depicted in FIG. 8, a sensor module 12 includes multiple sensors 14 distributed along the length of an elongate housing. This embodiment of the sensor module 12 may be approximately four feet long, with sensors 14 on each extreme end and one or more in the middle. Interface electronics within the module 12 provide for communications between the individual sensors 14, and communications with the tracker unit 18.

Figure 3A:
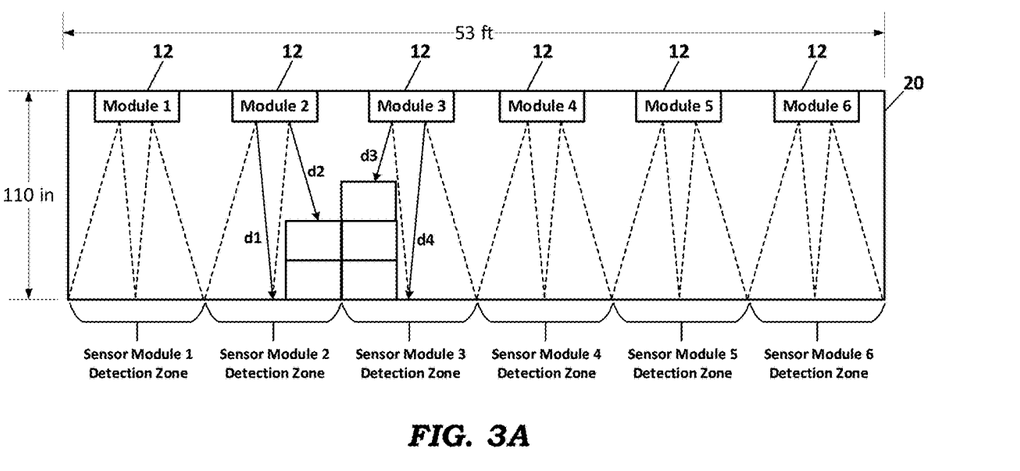
FIG. 3A depicts a side elevation view of the interior of a cargo trailer with cargo sensing modules installed therein according to a preferred embodiment.
Figure 3B:
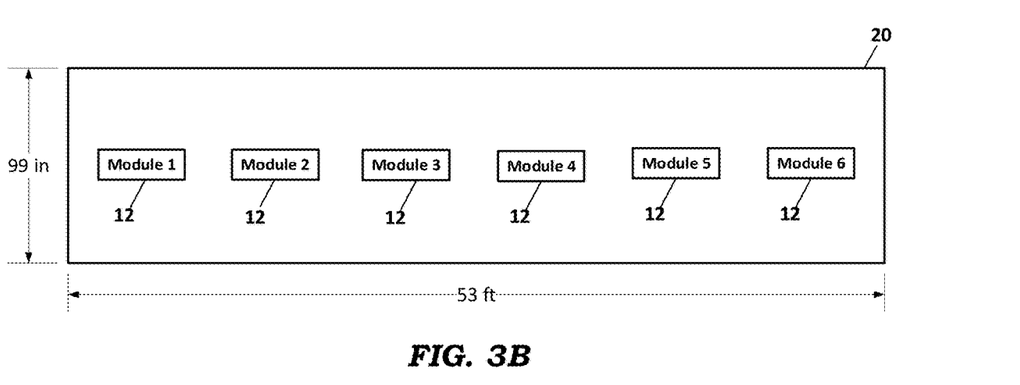
FIG. 3B depicts a top plan view of a cargo trailer with cargo sensing modules installed therein according to a preferred embodiment.
Figure 3C:
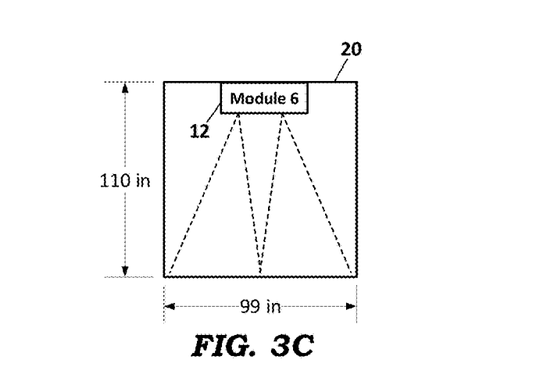
FIG. 3C depicts an end elevation view of a cargo trailer with cargo sensing modules installed therein according to a preferred embodiment.

As shown in FIG. 3A, each sensor module 12 detects a distance between the sensor module 12 and the closest surfaces that are within the module's detection zone. The detected surfaces may be the floor of the trailer or surfaces of pieces of cargo. For example, one sensor within the sensor module designated as Module 2 detects a distance d1 to the floor of the trailer, and another sensor within Module 2 detects a distance d2 to the top surface of a cargo container. One sensor within the sensor module designated as Module 3 detects a distance d3 to the top surface of a cargo container, and another sensor within Module 3 detects a distance d4 to the floor.

In a preferred embodiment, distance measurements from each detection zone, and/or the areas 22 within each detection zone, are reported either to the tracker unit 18 or via the tracker unit 18 to the back-end server 24. Using the distance measurements, a process executed by the back-end server 24 or by a processor in the tracker unit 18 determines one or more of:

(1) the total floor area of the trailer 20 that is occupied by cargo;
(2) the total volume of the trailer 20 that is occupied;
(3) which detection areas of the trailer floor are occupied; and
(4) the height to which each detection area of the trailer is loaded.

The occupied floor area (1) may be determined by counting the number of detection areas that report a distance (d1, d2, d3, d4, etc.) that is less than some threshold value related to the full height of the interior of the trailer, and multiplying that number by the floor area within each detection area. For example, if the threshold value is 110 inches, a reported distance of less than 110 inches indicates that the corresponding detection area 22 is occupied by cargo. In the exemplary trailer 20 depicted in FIG. 6, there are twenty-four detection areas 22, each occupying about 13 square feet of floor area. If sensors in twenty of the detection areas 22 report distances that are less than the threshold value, then at least about 260 ft² of the trailer floor space is occupied by cargo. (20×13 ft²=260 ft²)

The occupied trailer volume (2) may be determined by multiplying the size of each occupied detection area by the height above the floor of the detected cargo surface, and adding them all up. For example, if the twenty occupied areas from the previous example all have detected cargo surfaces that are at least 90 inches above the floor, then at least about 1950 ft³ of the trailer volume is occupied. (20×13 ft²×90/12 ft=1950 ft³)

Other information may be inferred as well, such as weight based on knowledge of the type of cargo and its total volume, and other relevant information. This information can be used in concert with an imaging cargo sensor to provide images at relevant times based on the position and state of the cargo load. The back end server 24 may also use this data to build a three-dimensional visualization of the cargo in the trailer, such as by displaying blocks based on x-position and y-position along with height in the z-direction.

Figure 10A:
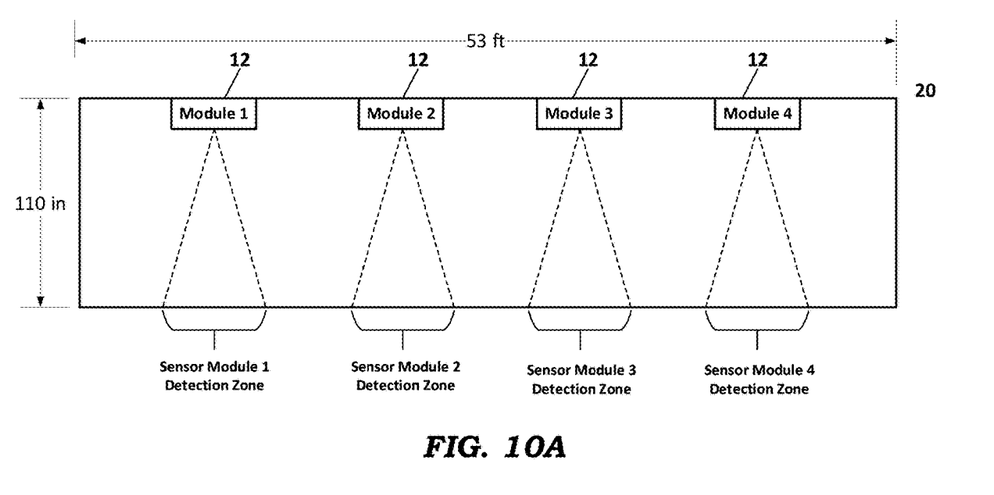
FIG. 10A depicts a side elevation view of the interior of a cargo trailer with cargo sensing modules installed therein according to an alternative embodiment.
Figure 10B:
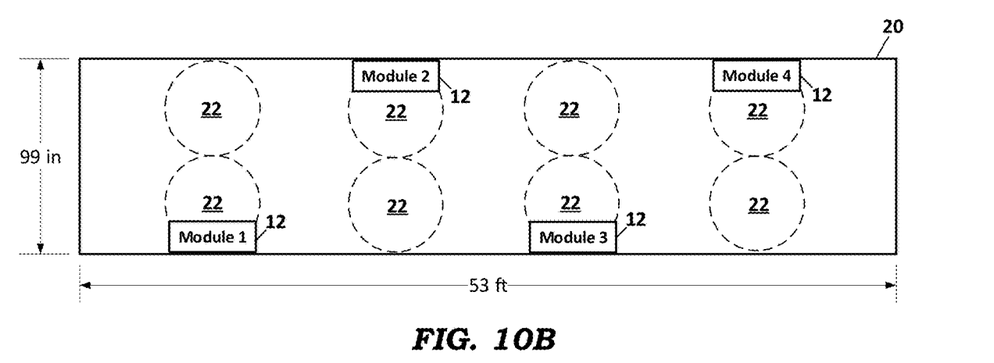
FIG. 10B depicts a top plan view of a cargo trailer with cargo sensing modules installed therein according to an alternative embodiment.
Figure 10C:
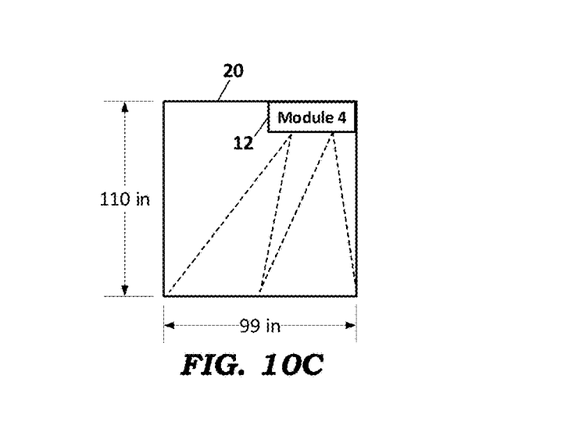
FIG. 10C depicts an end elevation view of a cargo trailer with cargo sensing modules installed therein according to an alternative embodiment.

In preferred embodiments, the sensor modules 12 are located near the center of the ceiling of the trailer. In an alternative embodiment depicted in FIGS. 10A-10C, sensor modules 12 may also be mounted in the corners of the trailer ceiling looking toward the opposite corners. This could provide a view with a larger detection areas 22 using fewer sensors.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for detecting cargo within a cargo container that has a ceiling, a floor, and an interior space disposed between the ceiling and the floor, the method comprising:
    (a) receiving a plurality of distance signals generated by a plurality of distance sensors mounted on or adjacent to the ceiling of the cargo container, each of the distance signals indicating a distance between a corresponding one of the distance sensors and a surface within the interior space of the cargo container;
    (b) determining a load state of the cargo container based on one or more of the plurality of the distance signals;
    (c) for each of the distance signals, determining a cargo height value based on the distance between the corresponding distance sensor and the surface located within the corresponding cargo detection area; and
    (d) calculating a total volume of the interior space of the cargo container occupied by cargo based on the cargo height values and area values for the portions of the total area of the floor of the cargo container in which cargo is present.

2. The method of claim 1 wherein:
    each of the distance sensors has a field of view, and the plurality of distance sensors are distributed across the ceiling of the cargo container such that their fields of view define a plurality of cargo detection areas distributed across the floor of the cargo container, wherein each cargo detection area corresponds to a portion of a total area of the floor of the cargo container; and
    each of the plurality of distance signals indicates a distance between a corresponding one of the distance sensors and a surface located within a corresponding one of the cargo detection areas.

3. The method of claim 2 further comprising calculating how much of the total area of the floor of the cargo container is occupied by cargo based on the distances indicated by the plurality of distance signals.

4. The method of claim 1 wherein each of the plurality of distance signals indicate a distance between a corresponding one of the distance sensors and either a surface of a piece of cargo or the floor of the cargo container.

5. The method of claim 1 wherein the ceiling of the cargo container is disposed at a height above the floor of the cargo container, and wherein the load state determination step comprises comparing the distance to a distance threshold that is less than the height.

6. The method of claim 1 further comprising providing one or more load state indications to a tracker unit mounted on the cargo container, and based on the one or more load state indications, transmitting load state information from the tracker unit to a backend server via a data communication network.

7. An apparatus for detecting cargo within a cargo container that has a ceiling, a floor, and an interior space disposed between the ceiling and the floor, the apparatus comprising:
    a plurality of distance sensors configured for mounting on or adjacent to the ceiling of the cargo container, the plurality of distance sensors generating a plurality of distance signals, each of the distance signals indicating a distance between a corresponding one of the distance sensors and a surface within the interior space of the cargo container; and one or more processors in communication with the plurality of distance sensors, the one or more processors operable to execute instructions to:

generate a load state indication based on one or more of the plurality of distance signals;

for each load state indication, determine a cargo height value based on the distance between the corresponding distance sensor and the surface located within the corresponding cargo detection area; and calculate a total volume of the interior space of the cargo container occupied by cargo based on cargo height values and area values for the portions of the total area of the floor of the cargo container in which cargo is present.

8. The apparatus of claim 7 wherein each of the plurality of distance sensors has a field of view, the plurality of distance sensors are mounted to the ceiling of the cargo container such that their fields of view define a plurality of cargo detection areas distributed across the floor of the cargo container, each cargo detection area corresponds to a portion of a total area of the floor of the cargo container, and each of the distance signals indicate a distance between a corresponding one of the distance sensors and a surface located within a corresponding one of the cargo detection areas.

9. The apparatus of claim 7 wherein the one or more processors are operable to execute instructions to calculate how much of the total area of the floor of the cargo container is occupied by cargo based at least in part on the load state indication.

10. The apparatus of claim 7 further comprising one or more sensor modules configured for mounting on or adjacent to the ceiling of the cargo container, each of the one or more sensor modules containing two or more of the plurality of distance sensors, wherein each of the two or more distance sensors in each sensor module has a field of view that is aligned in a different direction from fields of view of other distance sensors in one and the same sensor module.

11. The apparatus of claim 10 wherein the one or more processors are components of the one or more sensor modules.

12. The apparatus of claim 10 wherein multiple sensor modules are distributed across a length of a central portion of the ceiling of the cargo container.

13. The apparatus of claim 10 wherein multiple sensor modules are distributed across a length of the cargo container adjacent to locations at which the ceiling of the cargo container meets a wall of the cargo container.

14. The apparatus of claim 10 wherein:

one or more of the sensor modules are mounted on a door of the cargo container;

the one or more distance sensors contained in the one or more sensor modules mounted on the door each have a field of view directed toward a back wall of the cargo container when the door is in a closed position; and the one or more distance sensors contained in the one or more sensor modules mounted on the door each have a field of view directed toward the floor of the cargo container when the door is in an open position.

15. The apparatus of claim 10 wherein at least one of the one or more sensor modules contains an accelerometer used to determine an orientation of the at least one sensor module.

16. The apparatus of claim 7 wherein each of the distance signals indicate a distance between a corresponding one of the distance sensors and either a surface of a piece of cargo or the floor of the cargo container.

17. The apparatus of claim 7 wherein the ceiling of the cargo container is disposed at a height above the floor of the cargo container, and wherein the one or more processors are operable to execute instructions to compare the distance to a distance threshold that is less than the height.

18. The apparatus of claim 7 further comprising a tracker unit configured for mounting on the cargo container, the tracker unit operable to generate cargo loading information based on the load state indication, and transmit the cargo loading information from the tracker unit to a backend server via a data communication network.

19. The apparatus of claim 18 wherein the one or more processors are components of the tracker unit.

20. The apparatus of claim 18 wherein the one or more processors are components of the backend server.

21. The apparatus of claim 7 wherein the plurality of distance sensors comprise laser-ranging time-of-flight sensors or ultrasonic sensors.

* * * * *